United States Patent
Ravi et al.

(10) Patent No.: US 9,805,185 B2
(45) Date of Patent: Oct. 31, 2017

(54) DISPOSITION ENGINE FOR SINGLE SIGN ON (SSO) REQUESTS

(71) Applicant: CISCO TECHNOLOGY, INC., San Jose, CA (US)

(72) Inventors: Gunupuree Ravi, Bangalore (IN); Vivek Vishnoi, San Jose, CA (US); Vivek Biswas, San Jose, CA (US); Prabhat Chaturvedi, Bangalore (IN); Fowzy Shacker, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 11 days.

(21) Appl. No.: 14/268,795

(22) Filed: May 2, 2014

(65) Prior Publication Data
US 2015/0254450 A1 Sep. 10, 2015

Related U.S. Application Data

(60) Provisional application No. 61/950,597, filed on Mar. 10, 2014.

(51) Int. Cl.
G06F 21/41 (2013.01)
H04L 29/06 (2006.01)

(52) U.S. Cl.
CPC .......... *G06F 21/41* (2013.01); *H04L 63/0815* (2013.01); *H04L 63/10* (2013.01); *H04L 63/126* (2013.01); *H04L 63/168* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,609,198 B1 * | 8/2003 | Wood | G06F 21/31 713/155 |
| 7,086,085 B1 * | 8/2006 | Brown | G06F 21/6218 714/E11.207 |
| 7,908,380 B1 | 3/2011 | Chu et al. | |
| 2004/0139319 A1 * | 7/2004 | Favazza | H04L 63/0807 713/168 |
| 2005/0277420 A1 * | 12/2005 | Shin et al. | 455/442 |
| 2006/0250968 A1 * | 11/2006 | Hudis et al. | 370/241 |
| 2008/0016195 A1 | 1/2008 | Tulshibagwale et al. | |
| 2008/0092215 A1 * | 4/2008 | Soukup | H04L 63/0815 726/5 |

(Continued)

FOREIGN PATENT DOCUMENTS

WO    2013177687 A1    12/2013

OTHER PUBLICATIONS

International Search Report and Written Opinion for PCT/US2015/016648 mailed Jun. 9, 2015.

*Primary Examiner* — Fatoumata Traore
(74) *Attorney, Agent, or Firm* — Polsinelli PC

(57) ABSTRACT

Systems and methods are described for evaluating disposition of an SSO request. In one example, the method includes receiving the SSO request, the SSO request for accessing a secure service, the request having been denied authorization to access a first service, determining, based upon one or more criteria, where to direct the SSO request, and routing the SSO request to a second service, the routing based on the determining where to direct the SSO request.

20 Claims, 4 Drawing Sheets

(56) References Cited

U.S. PATENT DOCUMENTS

| | | | |
|---|---|---|---|
| 2008/0148351 A1* | 6/2008 | Bhatia | G06F 21/6218 726/2 |
| 2009/0292927 A1* | 11/2009 | Wenzel | G06F 21/41 713/185 |
| 2011/0162046 A1* | 6/2011 | Forster et al. | 726/4 |
| 2011/0265168 A1 | 10/2011 | Lucovsky et al. | |
| 2013/0247165 A1* | 9/2013 | Pal | H04L 63/08 726/10 |

* cited by examiner

DISPOSITION ENGINE FOR SINGLE SIGN ON (SSO) REQUESTS

RELATED APPLICATIONS

This application claims priority to U.S. Provisional Application No. 61/950,597, entitled "DISPOSITION ENGINE FOR SINGLE SIGN ON (SSO) REQUESTS," filed Mar. 10, 2014, which is incorporated herein by reference in its entirety.

TECHNICAL FIELD

The present disclosure relates to methods and systems for controlling the disposition of single sign on (SSO) requests.

BACKGROUND

A single sign-on session is an authentication process that permits a user to enter a single password in order to access multiple web-based applications. This process authenticates the user for each of the applications that they have been given rights to in order to eliminate further sign-on prompts when they switch from one application to another in a particular session. In such an environment, when a user request is redirected to a federated web application upon successful authentication, the federated web application needs to ensure if the request is authorized to execute the application. If the request cannot be authorized, then there needs to be a list of uniform resources locators (URLs) where the request can be properly routed, based on a series of parameters. In current models, each federated web application defines its own set of rules and parameters in order to properly route the request. However, this approach has a number of inherent challenges.

BRIEF DESCRIPTION OF THE DRAWINGS

There are shown in the drawings embodiments that are presently preferred it being understood that the invention is not limited to the arrangements and instrumentalities shown, wherein.

DESCRIPTION OF EXAMPLE EMBODIMENTS

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

In one aspect of the present disclosure, a method for evaluating disposition of a single sign on (SSO) request is disclosed. The method includes receiving the SSO request, the SSO request for accessing a secure service, the request having been denied authorization to access a first service, determining, based upon one or more criteria, where to direct the SSO request, and routing the SSO request to a second service, the routing based on the determining where to direct the SSO request.

In another aspect, an SSO disposition engine for evaluating disposition of a SSO request is disclosed. The SSO disposition engine includes a processor and a memory where the memory has computer-executable instructions that, when executed on the processor, cause the processor to determine, based upon one or more criteria, where to direct an SSO request to access a secure service, the request having been denied authorization to access a first service, and route the SSO request to a second service, the routing based on the determining where to direct the SSO request.

In yet another aspect, a system for evaluating disposition of a single sign on (SSO) request is disclosed. The system includes a first service, a second service, and a disposition engine. The disposition engine is adapted to receive the SSO request, the SSO request for accessing a secure service, the request having been denied authorization to access the first service, determine, based upon one or more criteria, where to direct the SSO request, and route the SSO request to the second service based on the determining where to direct the SSO request.

DETAILED DESCRIPTION

Figure 1:
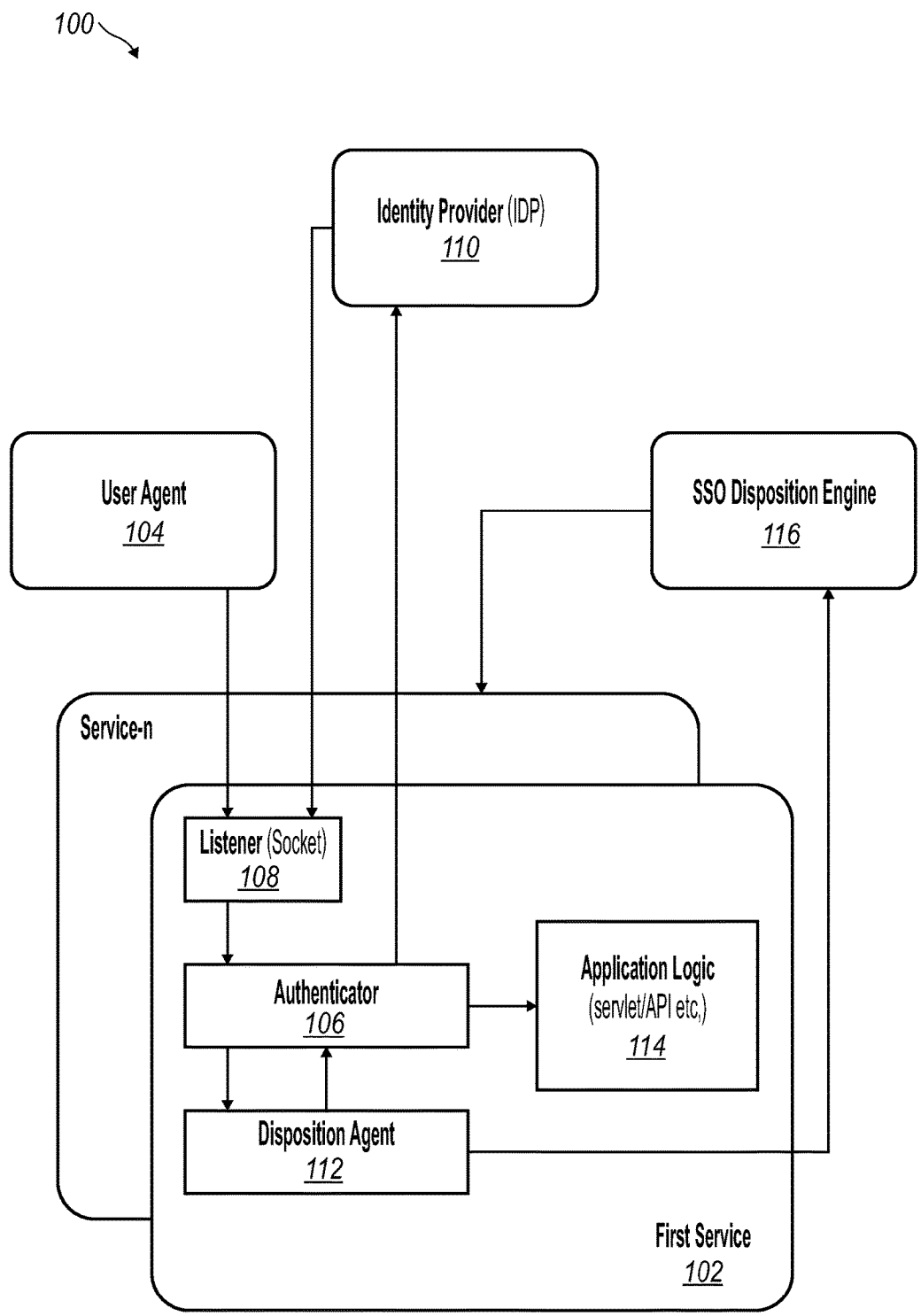
FIG. 1 is a system diagram in accordance with one or more examples described herein.

FIG. 1 illustrates an exemplary embodiment of the present disclosure, showing the components used for performing a SSO for federated web applications. In one embodiment, a security assertion markup language (SAML)-based authorization and authentication mechanism is used. SAML version 2.0 may be used but the present disclosure is not limited to a specific SAML version. In a network 100, a user wishes to access a secure web page of an online application offered by a service provider, e.g., first service 102, and sends an unauthenticated request from user agent 104. First service 102 can be any type of web service located at a particular URL, providing access to one or more web pages. User agent 104 may be a software agent that acts on behalf of the user's electronic communication device, such as a browser. User agent 104 provides the source of the user request, e.g., a web application, including the type of device that the user request comes from such as a mobile communication device or a desktop computer.

First service 102 is an entity that provides different types of services to the clients in a federated web environment. First service 102 may encapsulate an authenticator 106, which, via a listening module 108, intercepts the unauthenticated request to access first service 102 from user agent 104. Authenticator 106 is a component that is used by first service 102 to ensure that only authenticated requests are allowed to access first service 102. Authenticator 106 may use an authorization plugin, if provided, in order to allow application logic 114 to ensure access of a service to only authenticated requests. If an unauthenticated or unauthorized request is trying to access first service 102, authenticator 106 redirects the request to identity provider 110. Identity provider 110 provides SSO services and certificates of authenticity and can extend these certificates to other organizations and new services. Thus, identity provider 110 can provide an authentication token of users to other requesting services. Authenticator 106 can verify the SAML response by using the public signature of the private key issued by identity provider 110. If an authenticated request tries to access first service 102, authenticator 106 validates the security token, such as an SAML token. Upon successful authentication of the security token, authenticator 106 allows the request to be forwarded to first service 102.

Once a service is successfully authenticated, first service 102 makes use of a disposition agent 112 to determine if the request can be serviced by the web application provided by first service 102. Disposition agent 112 includes one or more processors, a plurality of network interfaces, and a memory interconnected by a system bus, where the network interfaces contain circuitry necessary for communicating data over physical links to each of the modules of network 100. Disposition agent 112 may include the same or similar components as an SSO disposition engine 116, shown in FIG. 4. Disposition agent 112 checks to see if the existing web application provided by first service 102 can or cannot be serviced based on different criteria. If the web application can be serviced, a page of the application is presented to the user via the user agent 104, e.g., the user is presented with a web page provided by first service 102, on the user's mobile device. If the web application of first service 102 cannot be serviced, disposition agent 112 sends the request to SSO disposition engine 116. SSO disposition engine 116 makes the determination where to route the authenticated requests. Rather than place the decision of where to route requests that cannot be serviced by first service 102 in the hands of separate services, SSO disposition engine 116 makes this determination using several criteria. Thus, SSO disposition engine 116 essentially takes on the burden from all web services and manages them, rather than each web service deciding what to do with each authenticated request.

SSO disposition engine 116 can be configured, for example, using an xml-based configuration file and can access this configuration file in order to determine where to route the request. One criterion that is used to determine where to route incoming authenticated requests is the role of the request. In another embodiment, a group of users having a set of roles is considered. Another criterion is the source URL of the request. For example, requests coming from a particular source URL may be directed to a destination URL for a particular company or application while requests coming from a different source URL may be directed to a different location. Another criterion used by SSO disposition engine 116 for determining where to route the request is the source where the request originated from. For example, the request may be sent by a user from their mobile device or the request may come from a desktop computer or a web application. User agent 104 detects what type of device the request came from and supplies this information as part of the request that is routed to disposition agent 112. This information is ultimately routed to SSO disposition engine 116. For example, SSO disposition engine 116 may determine that if a particular request came from a mobile device, that request is not routed to a particular destination. But if the same request came from a desktop computer, SSO disposition engine 116 does route the request to the desired destination.

Thus, based on one or more of these criteria, SSO disposition engine 116 can determine where to route the incoming request. The present disclosure is not limited to the specific criteria listed above. Thus, SSO disposition engine 116 may use any criteria in order to determine where to route incoming requests, once it has been determined that the request will not be routed to first service 102. Therefore, utilizing embodiments of the present disclosure, authorized requests that cannot be serviced by first service 102 can be routed elsewhere, to other services that can provide access to the user, rather than the user merely being informed that they were denied access to first service 102. Further, the decision of where to route the user's request is maintained in a central location, e.g., SSO disposition engine 116, rather than each of the other services having to determine whether or not to allow the request to access the web applications provided by the services.

In another exemplary embodiment of the present disclosure, SSO disposition engine 116 provides an authorization plugin that is adapted to authorize a service or a resource based on one or more conditions, e.g., roles, passed to it before it performs the routing of the request. In this embodiment, the one or more roles are extracted from authenticator 106 and forwarded to SSO disposition engine 116 in order for SSO disposition engine 116 to authorize the resource.

Figure 2A:
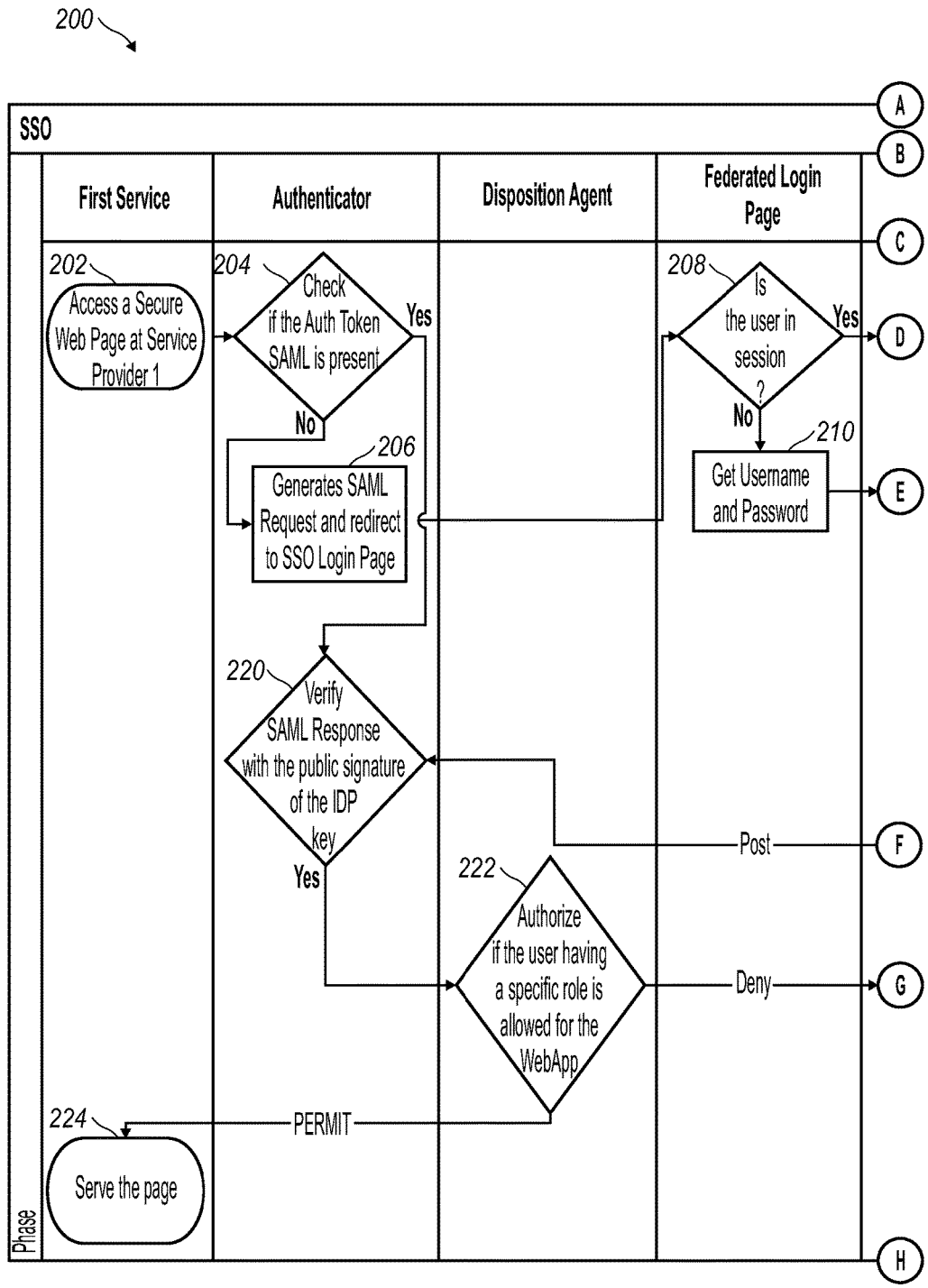
FIG. 2A is a flowchart showing a series of steps performed according to one or more examples described herein.
Figure 2B:
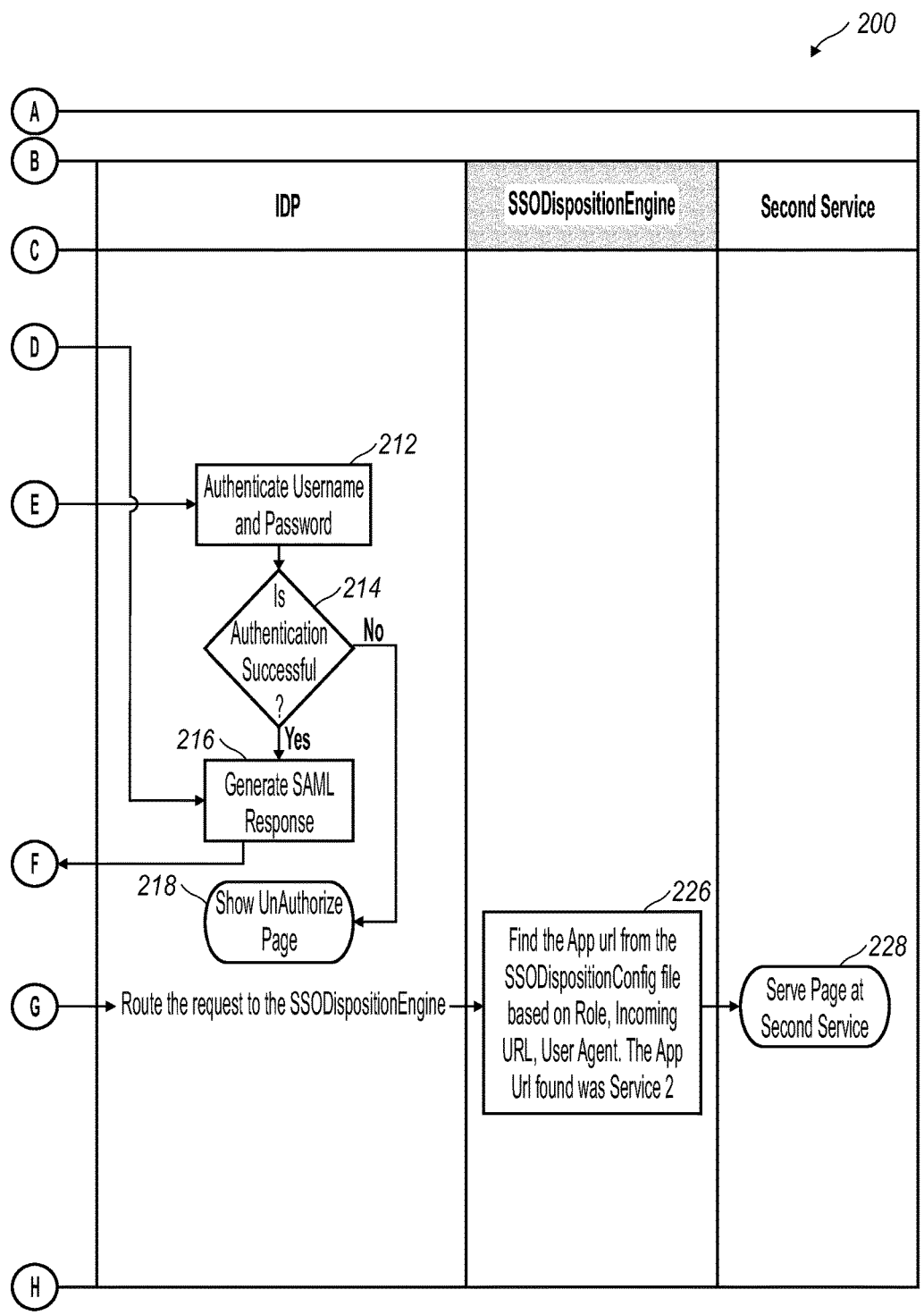
FIG. 2B is a continuation of the flowchart of FIG. 2A.

FIGS. 2A and 2B illustrate a flowchart 200 showing an exemplary embodiment of the present disclosure used, for example, in an SSO federated cloud environment. The SSO federated cloud environment can include one or more SSO federated cloud application-ecosystems. FIGS. 2A and 2B illustrate how, utilizing an embodiment of the present disclosure, an unauthenticated request attempting to access a first service 102 in an SSO environment, is routed to a disposition agent 112 which redirects the request to an SSO disposition engine 116, which then routes the request to an appropriate endpoint based on certain criteria and parameters. Initially, a user attempts to access a secure web page offered by a first service 102 (step 202 in FIG. 2A). Authenticator 106 then checks the request for the presence of a token (step 204), for example, an SAML token. If no SAML token is detected, authenticator 106 generates an SAML request and redirects the request to an SSO federated login page (step 206). The federated login page checks to see if the user is already in an active session (step 208), and if no current session exists, the user supplies or is prompted to supply their sign on information, for example their user name and/or password (step 210). The user name and/or password is then authenticated (step 212 in FIG. 2B) by identity provider 110 and if it is determined that authentication is successful (step 214), identity provider 110 generates an SAML token (step 216). This SAML token is then sent back to authenticator 106. If the authentication process (steps 212-214), which is performed by identity provider 110, does not successfully authenticate the user, then the user is directed to an unauthorized page or otherwise notified that the authentication process was unsuccessful (step 218).

Authenticator 106 can now verify if the SAML token is valid (step 220), by, for example, using a public signature of the private key provided by the identity provider 110, or by other traditional verification techniques. Once a verification of the SAML token is complete, and the request is authenticated, disposition agent 112 determines where the authenticated request is to be sent. Disposition agent 112 checks to see if the user is authorized to use first service 102, or not (step 222). This can be determined by identifying a role of the user, or can be determined by other criteria. If the user is permitted to use first service 102, then the request is sent back to first service 102 and the user is provided access to first service 102 by, for example, being served a web page (step 224). However, if disposition agent 112 determines that the user is not permitted to use first service 102, then disposition agent 112 routes the request to SSO disposition engine 116. SSO disposition engine 116 determines what service the request should be routed to, based on certain criteria. Thus, in the example in FIGS. 2A and 2B, SSO disposition engine 116 considers certain criteria and, based upon the criteria, determines that the request should be routed to an appropriate destination URL, e.g., second service (step 226). The URL associated with Service 2 is identified, the request routed to Service 2, and Service 2 then presents the user with access to the service (step 228).

Figure 3:
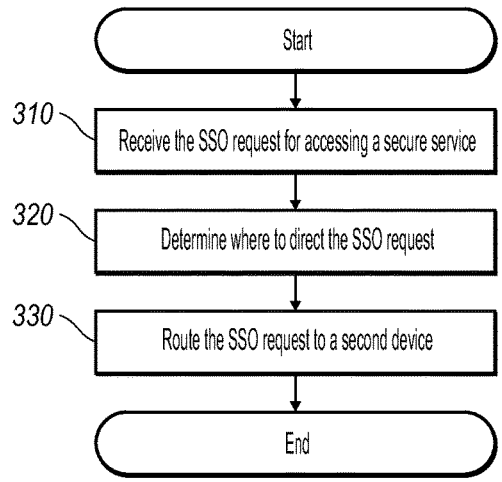
FIG. 3 is a flowchart showing a series of steps performed by the SSO disposition engine according to one or more examples described herein.

FIG. 3 is a flowchart illustrating steps taken by SSO disposition engine 116 according to an exemplary embodiment of the present disclosure. Upon it being determined by disposition agent 112 that the request to access first service 102 has been denied, the request is received by SSO disposition engine 116 (step 310). SSO disposition engine 116 has stored parameters and criteria in order to make a determination where to route the incoming user request. Rather than routing the request to various other services and have each service independently determine if the user can access the applications provided by the service, SSO disposition engine 116, using one or more criteria or procedures, determines where to route the request (step 320). SSO disposition engine 116 can then consult its configuration file to determine the URL of the service that the request is to be sent to. The request is then sent to the chosen service (step 330).

Figure 4:
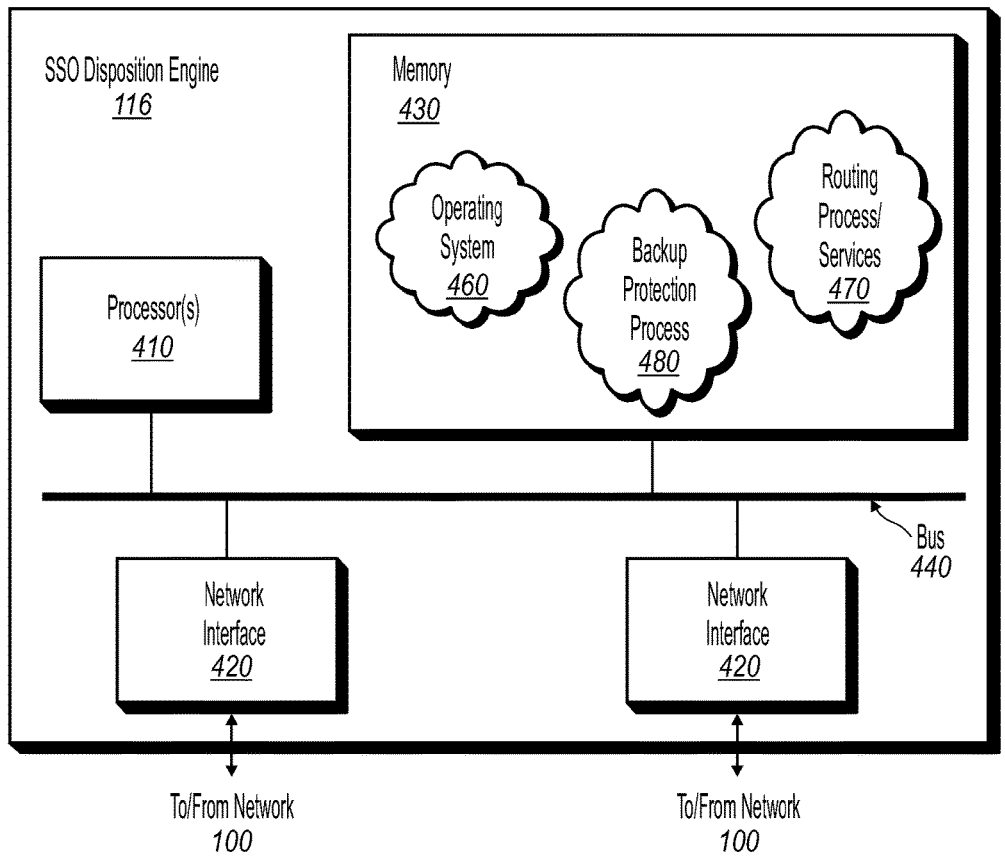
FIG. 4 is an SSO disposition engine that may be used with one or more examples disclosed herein.

FIG. 4 illustrates an exemplary SSO disposition engine 116 that may be used with one or more embodiments described herein. SSO disposition engine 116 includes one or more processors 410, a plurality of network interfaces 420, and a memory 430 interconnected by a system bus 440. Network interfaces 420 contain the mechanical, electrical, and signaling circuitry for communicating data over physical links coupled to the network 100. Network interfaces 420 may be configured to transmit and/or receive data using a variety of different communication protocols, including, inter alia, Transmission Control Protocol/Internet Protocol (TCP/IP), User Datagram Protocol (UDP), Asynchronous Transfer Mode (ATM), synchronous optical networks (SONET), wireless protocols, Frame Relay, Ethernet, Fiber Distributed Data Interface (FDDI), etc. Notably, a physical network interface 450 may also be used to implement one or more virtual network interfaces, such as for Virtual Private Network (VPN) access, known to those skilled in the art.

Memory 430 comprises a plurality of locations that are addressable by the processor 410 and network interfaces 420 for storing software programs and data structures associated with the embodiments described herein. Processor 410 may comprise necessary elements or logic adapted to execute the software programs and manipulate the data structures. An operating system 460 (e.g., the Internetworking Operating System, or IOS®, of Cisco Systems, Inc.), portions of which are typically resident in memory 430 and executed by processor 410, functionally organizes the node by, inter alia, invoking network operations in support of software processes and/or services executing on the node. These software processes and/or services may comprise routing process/services 470 and backup protection process 480 that may, for example, evaluate the disposition of SSO requests for accessing a secure source in a cloud environment, such as, for example, a federated cloud application.

It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also include the processes described herein being embodied as modules consisting of hardware, software, firmware, or combinations thereof.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all examples, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

The operating environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of various aspects of the disclosure as set forth in the claims.

We claim:

1. A method for evaluating disposition of a single sign on (SSO) request, the method comprising:
   receiving the SSO request, the SSO request for accessing a first one of a plurality of secure services;
   authenticating the SSO request by verifying an authentication token associated with the SSO request to yield an authenticated SSO request;
   determining which one of the plurality of secure services to direct the authenticated SSO request to, the determining comprising authorizing or denying the authenticated SSO request based upon one or more criteria to yield a determination;
   when the determination indicates that the authenticated SSO request is authorized, routing an authorized, authenticated SSO request to the first secure service; and
   when the determination indicates the authenticated SSO request is denied, routing a denied, authenticated SSO request to an SSO engine, the SSO engine automatically routing the denied, authenticated SSO request to a second secure service from among the plurality of secure services based on further determining that the denied, authenticated SSO request is authorized to access the second secure service.

2. The method of claim 1, wherein the one or more criteria includes at least one role of a requester.

3. The method of claim 1, wherein the one or more criteria includes a plurality of roles for a group of requesters.

4. The method of claim 1, wherein the one or more criteria includes a source uniform resource locator (URL) of the SSO request.

5. The method of claim 1, wherein the one or more criteria includes a type of device from which the SSO request originated.

6. A single sign-on (SSO) disposition engine for evaluating disposition of a SSO request, comprising:
   a processor; and
   a memory having computer-executable instructions that, when executed on the processor, cause the processor to:
      determine which one of a plurality of secure services to direct an authenticated SSO request to access a first secure service from among the plurality of secure services to, the determining comprising authorizing or denying the authenticated SSO request based upon one or more criteria to yield a determination;
      when the determination indicates that the authenticated SSO request is authorized, route an authorized, authenticated SSO request to the first secure service; and
      when the determination indicates the authenticated SSO request is denied, route a denied, authenticated SSO request to an SSO engine, the SSO engine automatically routing the denied, authenticated SSO request to a second secure service from among the plurality of secure services based on further determining that the denied, authenticated SSO request is authorized to access the second secure service.

7. The SSO disposition engine of claim 6, further comprising an authorization plugin adapted to authorize or deny an authenticated SSO request to access a secure service based on one or more conditions, prior to routing the authenticated SSO request to a secure service.

8. The SSO disposition engine of claim 6, wherein the one or more criteria includes at least one role of a requester.

9. The SSO disposition engine of claim 6, wherein the one or more criteria includes a plurality of roles for a group of requesters.

10. The SSO disposition engine of claim 6, wherein the one or more criteria includes a source uniform resource locator (URL) of the SSO request.

11. The SSO disposition engine of claim 6, wherein the one or more criteria includes a type of device from which the SSO request originated.

12. A system for evaluating disposition of a single sign on (SSO) request, the system comprising:
a first secure service;
a second secure service; and
a single sign-on (SSO) disposition engine adapted to:
receive a denied, authenticated SSO request for accessing the first secure service, the SSO request having been denied authorization to access the first secure service, the SSO request having been authenticated by verifying an authentication token associated with the SSO request;
determine, based upon one or more criteria, which one of a plurality of secure services to direct the denied, authenticated SSO request for accessing the first secure service to, the first secure service and the second secure service belonging to the plurality of secure services; and
upon determining that the denied, authenticated SSO request is authorized to access the second secure service, automatically route the denied, authenticated SSO request to the second secure service.

13. The system of claim 12, further comprising a SSO disposition agent, the SSO disposition agent adapted to:
determine whether the authenticated SSO request is authorized to access the first secure service;
upon determining that the authenticated SSO request is authorized to access the first secure service, forward the authorized, authenticated SSO request to the first secure service; and
upon determining that the authenticated SSO request is not authorized to access the first secure service, forward the denied, authenticated SSO request to the SSO disposition engine.

14. The system of claim 12, wherein the one or more criteria includes at least one role of a requester.

15. The system of claim 12, wherein the one or more criteria includes a plurality of roles for a group of requesters.

16. The system of claim 12, wherein the one or more criteria includes a source uniform resource locator (URL) of the SSO request.

17. The system of claim 12, wherein the one or more criteria includes a type of device from which the SSO request originated.

18. The system of claim 12, further comprising an authenticator, the authenticator adapted to determine whether the SSO request is authenticated to access the first secure service by verifying one or more of a security assertion markup language (SAML) token and a SAML Response token.

19. The system of claim 18, wherein the first secure service encapsulates the authenticator.

20. The system of claim 18, further comprising an identity provider, wherein the authenticator forwards the SSO request to the identity provider if the authenticator determines that the SSO request is not authenticated to access the first secure service.

* * * * *